United States Patent
Taurino

(10) Patent No.: US 12,225,939 B2
(45) Date of Patent: Feb. 18, 2025

(54) AEROSOL-GENERATING SYSTEM PROVIDING PREFERENTIAL EVAPORATION OF NICOTINE

(71) Applicant: Philip Morris Products S.A., Neuchatel (CH)

(72) Inventor: Irene Taurino, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 702 days.

(21) Appl. No.: 17/279,380

(22) PCT Filed: Sep. 25, 2019

(86) PCT No.: PCT/EP2019/075936
§ 371 (c)(1),
(2) Date: Mar. 24, 2021

(87) PCT Pub. No.: WO2020/064876
PCT Pub. Date: Apr. 2, 2020

(65) Prior Publication Data
US 2021/0392956 A1      Dec. 23, 2021

(30) Foreign Application Priority Data
Sep. 28, 2018   (EP) ..................................... 18197788

(51) Int. Cl.
*A24F 40/46*    (2020.01)
*A24B 15/16*    (2020.01)
(Continued)

(52) U.S. Cl.
CPC .............. *A24F 40/46* (2020.01); *A24B 15/16* (2013.01); *A24B 15/167* (2016.11);
(Continued)

(58) Field of Classification Search
CPC .......... A24F 40/46; A24F 40/10; A24F 40/44; A24F 40/50; A24F 40/51; A24F 40/57;
(Continued)

(56) References Cited

U.S. PATENT DOCUMENTS 9,949,507 B2    4/2018   Flick
2009/0133691 A1    5/2009   Yamada et al.
(Continued)

FOREIGN PATENT DOCUMENTS

EP    2 047 880 A1    4/2009
EP    2 833 744 B1    8/2016
(Continued)

OTHER PUBLICATIONS

Office Action issued Mar. 2, 2022 in corresponding European Patent Application No. 19 773 834.7, 5 pages.
(Continued)

*Primary Examiner* — Justin M Kratt
(74) *Attorney, Agent, or Firm* — Oblon, McClelland, Maier & Neustadt, L.L.P.

(57) ABSTRACT

An aerosol-generating device is provided, including a heater assembly including at least one heating element; an aerosol-forming substrate proximate to the assembly and including a liquid mixture including nicotine and a first aerosol-former having a boiling temperature higher than nicotine; a power supply to supply power to the assembly to generate an aerosol from the substrate; a mouthpiece to draw aerosol out of the device; and control circuitry to control the supply of power to the assembly, supply a first power to the element or to supply a power sufficient to maintain the element at a first temperature or first temperature range, between user puffs, and supply a second power to the element being higher than the first power or to raise a temperature of the element above the first temperature or the first temperature
(Continued)

range, during user puffs, to provide preferential evaporation of nicotine over the first aerosol former.

14 Claims, 4 Drawing Sheets

(51) Int. Cl.
 A24B 15/167 (2020.01)
 A24B 15/24 (2006.01)
 A24B 15/28 (2006.01)
 A24B 15/32 (2006.01)
 A24F 40/10 (2020.01)
 A24F 40/44 (2020.01)
 A24F 40/50 (2020.01)
 A24F 40/51 (2020.01)
 A24F 40/57 (2020.01)
 A24F 40/60 (2020.01)
 A24B 15/18 (2006.01)
 A24F 7/00 (2006.01)
 A24F 40/42 (2020.01)
 H02J 7/00 (2006.01)
(52) U.S. Cl.
 CPC ............ *A24B 15/243* (2013.01); *A24B 15/28* (2013.01); *A24B 15/32* (2013.01); *A24F 40/10* (2020.01); *A24F 40/44* (2020.01); *A24F 40/50* (2020.01); *A24F 40/51* (2020.01); *A24F 40/57* (2020.01); *A24F 40/60* (2020.01); *A24B 15/18* (2013.01); *A24F 7/00* (2013.01); *A24F 40/42* (2020.01); *H02J 7/0047* (2013.01)
(58) Field of Classification Search
 CPC . A24F 40/60; A24F 7/00; A24F 40/42; A24B 15/16; A24B 15/167; A24B 15/243; A24B 15/28; A24B 15/32; A24B 15/18; H02J 7/0047
 See application file for complete search history.

(56) References Cited

U.S. PATENT DOCUMENTS

| | | | |
|---|---|---|---|
| 2014/0299141 A1 | 10/2014 | Flick | |
| 2014/0345633 A1* | 11/2014 | Talon | A24F 40/53 702/30 |
| 2015/0040925 A1 | 2/2015 | Saleem et al. | |
| 2015/0208727 A1 | 7/2015 | Kuczaj | |
| 2016/0174610 A1 | 6/2016 | Kuczaj | |
| 2017/0224019 A1 | 8/2017 | Kuczaj | |
| 2017/0360096 A1* | 12/2017 | Silvestrini | F28B 9/08 |
| 2018/0020735 A1 | 1/2018 | Bilat et al. | |
| 2018/0042306 A1 | 2/2018 | Atkins et al. | |
| 2018/0116292 A1 | 5/2018 | Atkins et al. | |
| 2019/0274361 A1 | 9/2019 | Bilat et al. | |

FOREIGN PATENT DOCUMENTS

| | | |
|---|---|---|
| EP | 3 066 942 A1 | 9/2016 |
| EP | 2 797 447 B1 | 7/2017 |
| JP | 2013-545474 A | 12/2013 |
| JP | 2014-501107 A | 1/2014 |
| JP | 2014-525237 A | 9/2014 |
| JP | 2014-530632 A | 11/2014 |
| JP | 2015-507477 A | 3/2015 |
| JP | 2016-195585 A | 11/2016 |
| JP | 2017-512480 A | 5/2017 |
| JP | 2017-518289 A | 7/2017 |
| JP | 2017-518751 A | 7/2017 |
| JP | 2017-538408 A | 12/2017 |
| JP | 2017-538448 A | 12/2017 |
| KR | 10-2009-0023742 A | 3/2009 |
| RU | 2 605 837 C2 | 12/2016 |
| RU | 2 613 785 C2 | 3/2017 |
| WO | WO 2008/015918 A1 | 2/2008 |
| WO | WO 2013/025921 A1 | 2/2013 |
| WO | WO 2013/060781 A1 | 5/2013 |
| WO | WO 2013/098398 A2 | 7/2013 |
| WO | WO 2014/054035 A1 | 4/2014 |
| WO | WO 2015/117702 A1 | 8/2015 |
| WO | WO 2015/177177 A1 | 11/2015 |
| WO | WO 2016/096733 A1 | 6/2016 |
| WO | WO 2017/191176 A1 | 11/2017 |
| WO | WO 2018/019485 A1 | 2/2018 |
| WO | WO 2018/029077 A1 | 2/2018 |
| WO | WO 2018/066088 A1 | 4/2018 |

OTHER PUBLICATIONS

Extended European Search Report issued Apr. 19, 2019 in European Patent Application No. 18197788.5, 10 pages.
Chiara Parlati, et al. "Pulmonary Spray Dried Powders of Tobramycin Containing Sodium Stearate to Improve Aerosolization Efficiency" Pharmaceutical Research, vol. 26, No. 5, May 2009, pp. 1084-1092.
Qi Tony Zhou, et al. "Inhaled Formulations and Pulmonary Drug Delivery Systems for Respiratory Infections" Advanced Drug Delivery Reviews, vol. 85, 2015, pp. 83-99.
Qi Tony Zhou, et al. "Improving Aerosolization of Drug Powders by Reducing Powder Intrinsic Cohesion Via a Mechanical Dry Coating Approach" International Journal of Pharmaceutics, vol. 394, No. 1-2, 2010, pp. 50-59.
Qi Tony Zhou, et al. "Effect of Surface Coating with Magnesium Stearate Via Mechanical Dry Powder Coating Approach on the Aerosol on the Performance of Micronized Drug Powders from Dry Powder Inhalers" AAPS PharmSciTech, vol. 14, No. 1, Mar. 2013, pp. 38-44.
Qi Tony Zhou, et al. "Characterization of the Surface Properties of a Model Pharmaceutical Fine Powder Modified with a Pharmaceutical Lubricant to Improve Flow Via a Mechanical Dry Coating Approach" Journal of Pharmaceutical Sciences, vol. 100, No. 8, Aug. 2011, pp. 3421-3430.
Hamed Hamishehkar, et al., "The Role of Carrier in Dry Powder Inhaler" Recent Advances in Novel Drug Carrier Systems. Intech, 2012, pp. 39-66 and cover page.
Qi Tony Zhou, et al. "Understanding the Influence of Powder Flowability, Fluidization and De-Agglomeration Characteristic on the Aerosolization of Pharmaceutical Model Powders" European Journal of Pharmaceutical Sciences, vol. 40, No. 5, 2010, pp. 412-421.
David C. Cipolla, et al., "Formulation Technology to Repurpose Drugs for Inhalation Delivery" Drug Discovery Today: Therapeutic Strategies, vol. 8, No. 3-4, 2011, pp. 123-130.
International Search Report and Written Opinion issued Dec. 5, 2019 in PCT/EP2019/075936 filed Sep. 25, 2019.
Combined Russian Office Action and Search Report issued Dec. 9, 2022, in corresponding Russian Patent Application No. 2021108096/03(017421) (with English Translation) citing documents 15 and 16 therein, 18 pages.
Korean Office Action issued Mar. 5, 2024 in Korean Patent Application No. 10-2021-7010607 (with English Translation), 8 pages.
Riggs et al., "Thermochemical Properties of Nicotine Salts*", Contributions to Tobacco Research, vol. 19, No. 6, Jul. 2001, pp. 289-295.
Dou et al., "Thermogravimetric Kinetics of crude glycerol", Bioresource Technology, vol. 100, No. 9, 2009, 27 pages.
Gomez-Siurana et al., "TGA/FTIR study of tobacco and glycerol-tobacco mixtures", Thermochimica Acta 573, 2013, pp. 146-157 (total 13 pages).
"Glycerol", IPCS INCHEM, retrieved from https://web.archive.org/web/20180916162244/https://www.inchem.org/documents/icsc/icsc/eics0624.htm, Apr. 2006, 2 pages.
"Nicotine" IPCS INCHEM, retrieved from https://web.archive.org/web/20180916165056/https://www.inchem.org/documents/icsc/icsc/eics0519.htm, Sep. 1997, 1 page.

(56) References Cited

OTHER PUBLICATIONS

Anonymous, "Tobacco", Wikipedia, retrieved from https://web.archive.org/web/20180914234000/https://en.wikipedia.org/wiki/Tobacco, archived on Sep. 14, 2018, 1 page.

"Polyethylene Glycol (200-600)" IPCS INCHEM, retrieved from https://web.archive.org/web/20180916102959/https://www.inchem.org/documents/icsc/icsc/eics1517.htm, Apr. 2004, 1 page.

"Propylene Glycol", Ipcs Inchem, retrieved from https://web.archive.org/web/20180916043914/https://www.inchem.org/documents/icsc/icsc/eics0321.htm, Apr. 2014, 1 page.

"Pharmaceutical Vegetable Glycerine", Chemnovactic, retrieved from https://chemnovatic.com/MSDS/doc/CHEMNOVATIC_MSDS_Pharmaceutical%20Vegetable%20Glycerin_ENG.pdf, Oct. 28, 2016, 8 pages.

Combined Chinese Office Action and Search Report issued Aug. 30, 2023 in Chinese Patent Application No. 201980058041.7 (with English Translation), 15 pages.

Japanese Notice of Allowance issued Oct. 26, 2023 in Japanese Patent Application No. 2021-514562 (with English Translation), 4 pages.

Japanese Office Action Dated Oct. 29, 2024 (corresponding Japanese Patent Application No. 2023-199935, filed Nov. 27, 2023), with English Translation.

\* cited by examiner

AEROSOL-GENERATING SYSTEM PROVIDING PREFERENTIAL EVAPORATION OF NICOTINE

The invention relates to aerosol-generating systems, and in particular to aerosol-generating systems that generate aerosols containing nicotine by heating an aerosol-forming substrate.

One type of heated aerosol-generating system that generates an aerosol containing nicotine is an e-cigarette. An e-cigarette typically heats a liquid containing nicotine and an aerosol former to generate an aerosol.

Nicotine containing liquids, for consumer use in aerosol generating devices such as e-cigarettes, typically contain a relatively low concentration of nicotine. Nicotine in high concentrations can be irritating to the skin, and if ingested is potentially harmful. The nicotine concentration of the liquids is regulated by some jurisdictions, for example to be no greater than 20 mg/ml.

However, for e-cigarettes to be satisfying for users that have previously smoked conventional cigarettes, it is necessary for the e-cigarette to deliver a comparable amount of nicotine in each user puff as the cigarettes they are used to smoking. Without this level of nicotine delivery, users are likely to return to smoking conventional cigarettes.

Using a nicotine containing liquid with a relatively low concentration of nicotine such as 20 mg/ml or less as a substrate to generate aerosol, it is challenging to deliver sufficient nicotine in each user puff to satisfy habitual smokers. Prior attempts to solve this issue have included providing an auxiliary nicotine source in solid form within the aerosol generating device, from which nicotine is released by heating or by drawing vapour through or past it. However, this significantly increases the complexity and cost of the e-cigarette. And it is difficult to obtain consistent nicotine delivery with systems of that type.

It would be desirable to provide an aerosol-generating system that is able to deliver a higher amount of nicotine in each user puff using a nicotine containing liquid with a given nicotine concentration, without requiring an additional nicotine source.

In a first aspect of the invention, there is provided an aerosol-generating device comprising:
  a heater assembly comprising at least one heating element;
  an aerosol-forming substrate proximate to the heater assembly, the aerosol-forming substrate comprising a liquid mixture comprising nicotine and a first aerosol-former, the first aerosol-former having a boiling temperature higher than nicotine;
  a power supply for supplying power to the heater assembly to generate an aerosol from the aerosol-forming substrate;
  a mouthpiece on which a user puffs to draw aerosol out of the aerosol-generating device; and
  control circuitry configured to control the supply of power to the heater assembly, wherein the control circuitry is configured to supply a first power to at least one heating element of the heater assembly, or to supply a power sufficient to maintain at least one heating element of the heater assembly at a first temperature or within a first temperature range, between user puffs, and configured to supply a second power to at least one heating element of the heater assembly, the second power being higher than the first power, or being sufficient to raise the temperature of at least one heating element of the heater assembly above the first temperature or first temperature range, during user puffs, to preferentially vaporise nicotine over the first aerosol former.

Advantageously, the aerosol-forming substrate is heated by the heating element both during puffs and between user puffs. Preferably, the aerosol-forming substrate remains in contact with, or proximate to, the heating element throughout operation of the device. The aerosol-forming substrate may comprise a liquid held in a retaining material or in a capillary that is in contact with, or proximate to, the heating element. By heating the aerosol-forming substrate between user puffs, preferential evaporation of nicotine is promoted.

This temperature control strategy promotes preferential evaporation of nicotine over the first aerosol-former. In other words, the vapour produced will have a higher proportion of nicotine relative to the first aerosol-former than the liquid does. This means that the generated aerosol, which is formed from the vapour, will provide a greater amount of nicotine per user puff than it would simply by heating the liquid during user puffs. By continuously maintaining the liquid at a temperature close to the boiling point of nicotine, thermodynamic equilibrium is maintained. This ensures that there is significant preferential evaporation of the nicotine compared to the first aerosol-former. The temperature of the heating element, or the power supplied to the heater assembly, is raised during user puffs to ensure that a sufficient aerosol density and a sufficient amount of nicotine is delivered to the user during each puff. In this way, liquids with a relatively low concentration of nicotine can still be used to provide a satisfying user experience.

Advantageously, the first temperature or first temperature range is below the boiling point of the first aerosol-former. More preferably, the first temperature or first range of temperatures is below the boiling point of nicotine. This results in a greater disparity in evaporation rate between the nicotine and the first aerosol-former.

As used herein, an aerosol-former refers to any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate.

The boiling point of a liquid is the temperature at which the vapour pressure of a liquid equals the external pressure surrounding the liquid. As used herein, boiling point refers to the normal boiling point or atmospheric boiling point, which is the temperature at which the vapour pressure of the liquid equals the pressure at sea level (1 atmosphere).

The first aerosol former may be glycerol, which is also referred to as glycerine. Glycerol has a higher boiling point than nicotine. Glycerol is commonly used as an aerosol-former for aerosol that are to be inhaled by humans.

The aerosol-forming substrate may comprise a second aerosol-former, the second aerosol-former having a lower boiling temperature than first aerosol former. The second aerosol former is propylene glycol. The provision of a second aerosol-former with a lower boiling point allows for finer control over the proportion of nicotine contained in the aerosol produced. The second aerosol former may have a boiling point lower than nicotine. The first temperature or first temperature range may be higher than the boiling point of the second aerosol-former.

The control circuitry may be configurable by the user to select the first temperature or first temperature range or the first power. This may allow the user to select the relative amounts of nicotine and aerosol-formers in the aerosol. The first temperature or first temperature range may be constant through use or may vary during the course of a use session.

The control circuitry may be configured to calculate the second power dependent on the first power or first temperature or first temperature range. For example, the second temperature may be predetermined number of degrees higher than a selected first temperature. Or the second power may be a predetermined number of Watts greater than the first power. The first power may be a predetermined power or a power required to maintain a predetermined first temperature of the heating element or aerosol-forming substrate.

The heater assembly may comprise a plurality of heating elements. The control circuitry may be configured to supply power to only a portion of the plurality of heating elements between user puffs. The control circuitry may be configured to supply power to a greater portion, or all, of the heating elements during heater puffs. In this way a temperature of the liquid aerosol-forming substrate may be maintained between user puffs and raised during user puffs, as desired.

The first power may be a power sufficient to maintain the temperature of the heating element or the aerosol-forming substrate at around 200 degrees centigrade. In one embodiment, the heating element is a resistive heating element with an electrical resistance of between 0.7-0.8 Ohms and the first power is about 2 Watts. The first power may be between 1 and 3 Watts and more preferably between 1.4 and 2 Watts.

The first temperature may be between 150 and 200 degrees centigrade. This is lower than the boiling point of nicotine but high enough to result in significant evaporation of nicotine.

The first range of temperatures may be between 150 and 200 degrees centigrade.

The second power may be chosen to provide a desired total amount of nicotine delivered per puff and to provide a desired total amount of aerosol condensed matter (ACM) per puff. The duration of the application of the second power will also affect the total amount of nicotine delivered per puff and the total amount of aerosol condensed matter delivered per puff.

The second power may be between 2 and 6 Watts, and more preferably between 2.4 and 3 Watts. The second power may be between 1 and 4 Watts greater than the first power. In one embodiment, the second power is 3 Watts and the first power is 2 Watts.

The second power may be a power sufficient to maintain the heating element of aerosol forming substrate at a second temperature or within a second range of temperatures. The second temperature or second range of temperatures may be between 200 and 250 degrees centigrade. In one embodiment the second temperature is 220 degrees centigrade.

The device may further comprise a liquid reservoir holding the liquid aerosol-forming substrate and a liquid delivery mechanism configured to deliver liquid aerosol-forming substrate from the reservoir to the heating element. The liquid delivery mechanism may be an active mechanism, such as a pump, or may be a passive mechanism, such as a capillary material, described in more detail below.

The heater assembly may comprise a heating element that is heated in one of a number of different ways. For example, the heating element may be resistively heated by passing a current through it, the current provided by the power supply. Alternatively, or in addition, the heating element may be a susceptor that is inductively heated by a time varying magnetic field.

The heater assembly may also have a number of different forms. In some embodiments, the heater assembly comprises a mesh of heating elements or a perforated heating plate. The heater assembly may comprise a substantially flat heating element to allow for simple manufacture. The heating element may comprise a flat heating track, for example in a serpentine shape.

The heating element may comprise an array of filaments, for example arranged parallel to each other. Preferably, the filaments may form a mesh. The mesh may be woven or non-woven. The mesh may be formed using different types of weave or lattice structures. Alternatively, the electrically conductive heating element consists of an array of filaments or a fabric of filaments.

In a preferred embodiment, a substantially flat heating element may be constructed from a wire that is formed into a wire mesh. Preferably, the mesh has a plain weave design. The heating element may be a wire grill made from a mesh strip.

The filaments may define interstices between the filaments and the interstices may have a width of between 10 micrometres and 100 micrometres. Preferably, the filaments give rise to capillary action in the interstices, so that in use, liquid to be vaporized is drawn into the interstices, increasing the contact area between the heating element and the liquid aerosol-forming substrate.

The area of the mesh, array or fabric of electrically conductive filaments may be small, for example less than or equal to 50 square millimetres, preferably less than or equal to 25 square millimetres, more preferably approximately 15 square millimetres. The size is chosen such to incorporate the heating element into a handheld system. Sizing of the mesh, array or fabric of electrically conductive filaments less or equal than 50 square millimetres reduces the amount of total power required to heat the mesh, array or fabric of electrically conductive filaments while still ensuring sufficient contact of the mesh, array or fabric of electrically conductive filaments to the liquid aerosol-forming substrate. The mesh, array or fabric of electrically conductive filaments may, for example, be rectangular and have a length between 2 millimetres to 10 millimetres and a width between 2 millimetres and 10 millimetres. Preferably, the mesh has dimensions of approximately 5 millimetres by 3 millimetres.

The filaments of the heating element may be formed from any material with suitable electrical properties. Suitable materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group.

Examples of suitable metal alloys include stainless steel, constantan, nickel-, cobalt-, chromium-, aluminum-, titanium-, zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminum based alloys and iron-manganese-aluminum based alloys. Timetal® is a registered trade mark of Titanium Metals Corporation. The filaments may be coated with one or more insulators. Preferred materials for the electrically conductive filaments are stainless steel and graphite, more preferably 300 series stainless steel like AISI 304, 316, 304L, 316L. Additionally, the electrically conductive heating element may comprise combinations of the above materials. A combination of materials may be used to improve the control of the resistance of the substantially flat heating element. For example, materials with a high intrinsic resistance may be combined with materials with a low intrinsic resistance. This may be advantageous if one of the materials is more beneficial from other perspectives, for example price, machinability or other physical and chemical parameters. Advantageously, a substantially flat filament arrangement with increased resistance reduces parasitic losses. Advantageously, high resistivity heaters allow more efficient use of battery energy.

Preferably, the filaments are made of wire. More preferably, the wire is made of metal, most preferably made of stainless steel.

The electrical resistance of the heating element may be between 0.3 Ohms and 4 Ohms. Preferably, the electrical resistance is equal or greater than 0.5 Ohms. More preferably, the electrical resistance of the heating element is between 0.6 Ohms and 2 Ohms, and most preferably about 0.7 Ohms.

The liquid reservoir may include a liquid retention material for holding a liquid aerosol-forming substrate. The liquid retention material may be a foam, and sponge of collection of fibres. The liquid retention material may be formed from a polymer or co-polymer. In one embodiment, the liquid retention material is a spun polymer. The retention material may a porous ceramic or glass fibre, for example.

Preferably, the device comprises a capillary material for transporting liquid aerosol-forming substrate to the heating element. The capillary material may be provided in contact with the heating element. Preferably, the capillary material is arranged between the heating element and the retention material.

The capillary material may be made of a material capable of guaranteeing that there is liquid aerosol-forming substrate in contact with at least a portion of the surface of the heating element. The capillary material may extend into interstices of the heating element. The heating element may draw liquid aerosol-forming substrate into the interstices by capillary action.

A capillary material is a material that actively conveys liquid from one end of the material to another. The capillary material may have a fibrous or spongy structure. The capillary material preferably comprises a bundle of capillaries. For example, the capillary material may comprise a plurality of fibres or threads or other fine bore tubes. The fibres or threads may be generally aligned to convey liquid aerosol-forming substrate towards the heating element. Alternatively, the capillary material may comprise sponge-like or foam-like material. The structure of the capillary material forms a plurality of small bores or tubes, through which the liquid aerosol-forming substrate can be transported by capillary action. The capillary material may comprise any suitable material or combination of materials. Examples of suitable materials are a sponge or foam material, ceramic- or graphite-based materials in the form of fibres or sintered powders, foamed metal or plastics material, a fibrous material, for example made of spun or extruded fibres, such as cellulose acetate, polyester, or bonded polyolefin, polyethylene, terylene or polypropylene fibres, nylon fibres or ceramic. The capillary material may have any suitable capillarity and porosity so as to be used with different liquid physical properties. The liquid aerosol-forming substrate has physical properties, including but not limited to viscosity, surface tension, density, thermal conductivity, boiling point and vapour pressure, which allow the liquid aerosol-forming substrate to be transported through the capillary medium by capillary action.

The liquid retention material and capillary material may be heat resistant up to 250 degrees centigrade. The liquid retention material and capillary material preferably have a relatively weak interaction with nicotine.

The aerosol-forming substrate comprises a liquid mixture comprising nicotine and a first aerosol-former. Preferably, the liquid mixture comprises no more than 4% by mass nicotine and more preferably 2% or less nicotine by mass. The liquid mixture preferably comprises no more than 20 mg/ml.

The liquid mixture may comprise up to around 98% by mass of the first aerosol former. Preferably the liquid mixture comprises no more than 75 % by mass of the first aerosol-former. The first aerosol former may be glycerol.

Preferably, the liquid mixture contains no more than 25% by mass of the second aerosol former. Preferably, the liquid mixture comprises around three times more of the first aerosol former by mass than the second aerosol former.

The liquid mixture may contain water. The liquid mixture may contain flavour compounds.

The power supply is advantageously a battery, such as a lithium ion battery. As an alternative, the power supply may be another form of charge storage device such as a capacitor. The power supply may require recharging. For example, the power supply may have sufficient capacity to allow for the continuous generation of aerosol for a period of around six minutes or for a period that is a multiple of six minutes.

The control circuitry may comprise a microcontroller. The microcontroller is preferably a programmable microcontroller. The electric circuitry may comprise further electronic components. The electric circuitry may be configured to regulate a supply of power to the heater assembly. The power may be supplied to the heater assembly in the form of pulses of electrical current.

The control circuitry may comprise an airflow sensor positioned to detect user puffs on the system. The airflow sensor may comprise a microphone or capacitive sensor.

Alternatively, or in addition, user puffs may be indicated to the control circuitry by the user pressing a button on the system immediately prior to, or during, each user puff.

Preferably, the aerosol-generating device is a handheld device. Preferably, the aerosol-generating device is portable. The aerosol-generating device may have a size comparable to a conventional cigar or cigarette. The device may have a total length between approximately 30 millimetres and approximately 150 millimetres. The device may have an external diameter between approximately 5 millimetres and approximately 30 millimetres.

The device may be an electrical smoking device, such as an e-cigarette. The device may comprise a reusable portion, containing the power supply and the control circuitry, and a consumable portion, containing the aerosol-forming substrate. The heater assembly may be in the reusable portion, or in the consumable portion, or partially in both. Alternatively, the heater assembly may be provided in a separate component. The liquid aerosol-forming substrate may be held in a reservoir. The reservoir may be refillable.

In a second aspect of the invention, there is provided a method of generating a nicotine containing aerosol from an aerosol-forming substrate in an aerosol-generating system on which a user puffs in use, the aerosol-forming substrate comprising a liquid mixture comprising nicotine and a first aerosol-former, the first aerosol-former having a boiling temperature higher than nicotine, the method comprising:

maintaining the aerosol-forming substrate within a first temperature range between user puffs; and heating the aerosol-forming substrate to a second temperature above the first temperature range during user puffs, so as to preferentially vaporise nicotine over the first aerosol former.

Preferably, the second temperature is below the boiling temperature of first aerosol-former. The aerosol-forming substrate may comprises a second aerosol former, the second aerosol former having a lower boiling temperature than first aerosol former.

The first temperature range may be below the boiling temperature of nicotine and the second aerosol former.

It should be clear that features described in relation to the first aspect of the invention are applicable to the second aspect of the invention.

The invention provides for preferential evaporation of nicotine, leading to higher nicotine concentration in the generated aerosol than in the liquid aerosol-forming substrate. This allows for a satisfying user experience, even when using a liquid with a low concentration of nicotine. This helps to people to quit conventional cigarettes. It also allows for the use of liquid with a low concentration of nicotine, which is easier to handle during transportation and also during use, particularly for refillable systems.

Embodiments of the invention will now be described, by way of example only, with reference to the accompanying drawings, in which.

In an aerosol-generating system that generates aerosol for user inhalation by heating an aerosol-forming substrate, there are typically two different types of heating control. The most common type of heating control for a liquid aerosol-forming substrate is so-called "flash" heating, in which an amount of the liquid is rapidly heated for a short time to generate a vapour. The flash heating may coincide with the timing of user puffs or inhalations so that aerosol is generated only during user puffs. Flash heating is also used to vaporise thin films or coatings of aerosol-forming substrate. The other type of heating control is so-called "continuous" heating, in which the aerosol-forming substrate is heated for a sustained period independent of user puffs or inhalation. This type of heating control is more common when heating a larger mass of solid aerosol-forming substrate, such as a tobacco rods.

The embodiments described here use a combination of continuous heating and flash heating to provide for preferential evaporation of nicotine from a liquid mixture while generating more aerosol condensed matter (ACM) during user puffs. Preferential evaporation of nicotine means that the nicotine is vaporised at a significantly higher rate than at least one other component of the liquid mixture, so that the concentration of nicotine in the generated vapour is higher than in the liquid mixture. By using a liquid mixture containing an aerosol-former with a higher boiling temperature than nicotine (or lower partial vapour pressure than nicotine) and a hybrid of continuous heating and flash heating it is possible to achieve significant increases in the concentration of nicotine in the vapour and so in the generated aerosol. Maintaining the liquid mixture at a temperature closer to the boiling point of nicotine than to the boiling point of the aerosol-former between puffs promotes preferential evaporation of nicotine. Increasing the temperature or boosting the power supplied to the heating element during user puffs allows for a desired total amount of ACM and nicotine to be delivered in each user puff.

Preferential evaporation of nicotine allows for liquid mixtures with lower concentrations of nicotine to be used. This is advantageous because lower concentrations of nicotine in the liquid makes the liquid easier to handle during manufacture transport and use, and is particularly beneficial if end users are required to refill the aerosol-generating system with the liquid. It also allows liquids that clearly comply with national or international regulations to be used, while still providing users with a satisfying experience.

Figure 1:
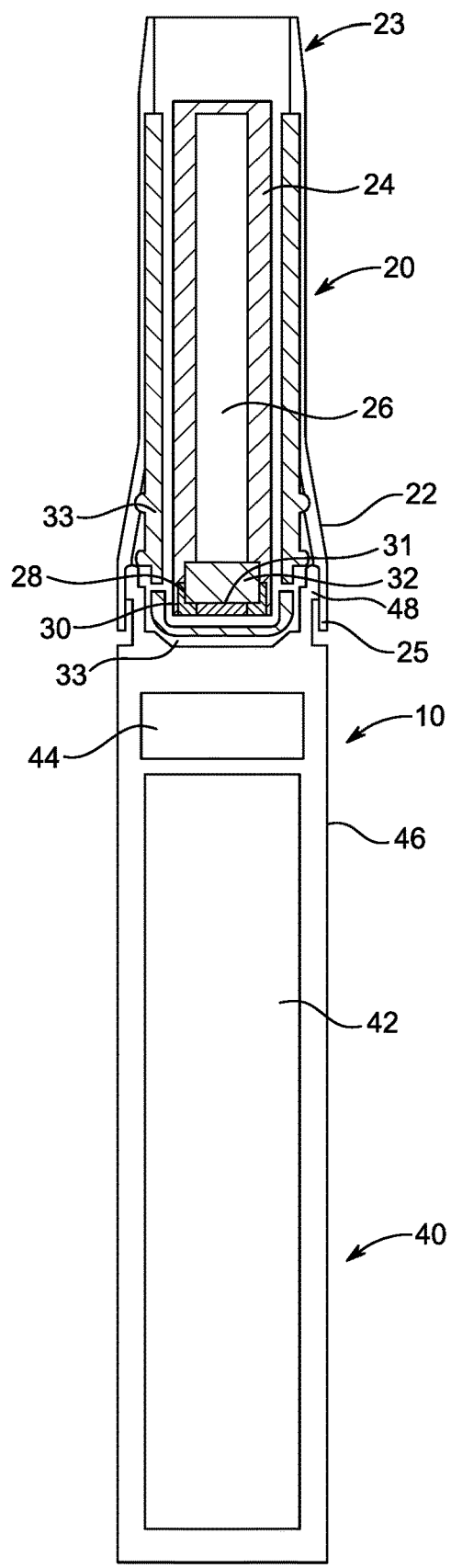
FIG. 1 is a simplified cross-section of an aerosol-generating system in accordance with an embodiment of the invention.

FIG. 1 is a simplified cross-section of an aerosol-generating system 10 in accordance with an embodiment of the invention. The system of FIG. 1 comprises a cartridge 20 and a device portion 40 that are coupled together.

The cartridge comprises a supply of liquid aerosol-forming substrate and heater assembly. The device portion comprises a power supply and control circuitry. The device portion functions to supply electrical power to the heater assembly in the cartridge in order to vapourise the liquid aerosol-forming substrate. The vapourised aerosol-forming substrate is entrained in an airflow through the system, the airflow resulting from a user puffing on a mouthpiece of the cartridge. The vapourised aerosol-forming substrate cools in the airflow to form an aerosol before being drawn into a user's mouth.

Figure 2:
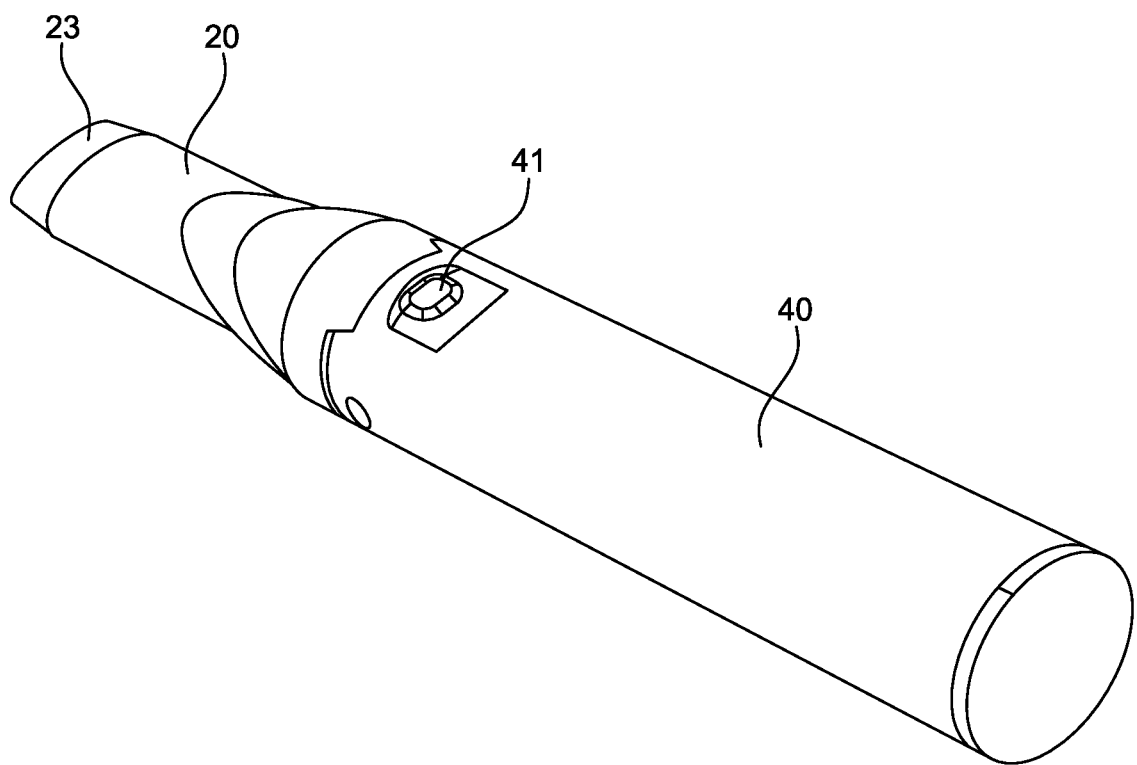
FIG. 2 is a perspective view of the system of FIG. 1.

FIG. 2 is a perspective view of the system shown in FIG. 1. A system comprising the same hardware components is described in WO2018/019485.

The device portion 40 comprises a housing 46, holding a lithium ion battery 42 and control circuitry 44. The device portion also comprises spring loaded electrical contact elements (not shown), configured to contact electrical contact pads on the heater assembly in the cartridge. A button 41 is provided, that actuates a switch in the control circuitry to activate the device. When the device is activated, the control circuitry supplies power from the battery to the heater in the cartridge.

The cartridge 20 has a mouthpiece end, comprising a mouthpiece 23 on which a user can puff. The mouthpiece end is remote from the device portion. A device end of the cartridge is proximate to the device portion.

The cartridge 20 comprises a housing 22. Within the housing there is a reservoir or storage container 24 holding liquid aerosol-forming substrate 26. The storage container is open at the device end. A heater assembly comprising a flat mesh heating element is held on a heater cap 30. The heater cap is fitted onto the open end of the storage container. A liquid retention 32 material is positioned within the cap. A capillary material 31 is positioned between the heater assembly 28 and the retention material 32. A protective cover 33 is fitted to the housing and retains the heater assembly and heater cap to the storage container. The protective cover also covers the heating element and protects it from damage.

The heater cap 30 has an opening formed in a front face and the heater assembly extends across the opening. The heater assembly comprises a pair of electrical contact pads fixed to the heater cap and heating element, comprising a mesh of electrically conductive heater filaments spanning the opening and fixed to the electrical contacts on opposite sides of the opening. A heater assembly of this type is described in WO2015/117702.

As can be seen from FIG. 1, when the protective cover 33 is in position in the cartridge it presses against the periphery of the heater assembly but it does not contact the heating element. An airflow path to and from the heating element is provided between the protective cover 33 and the heater assembly 28 and storage container 24, as will be described in more detail with reference to FIG. 3.

The protective cover is shaped to provide a barrier between the airflow path past the heating element and the electrical contact pads. The protective cover contacts the heater assembly between the exposed portion of the contact pads and the central portion of the heating element to provide this barrier and to secure the heater assembly to the storage container. This arrangement reduces the possibility of leaked or condensed liquid aerosol-forming substrate contaminating the contact surfaces of the electrical contact pads and electrical contact elements. In addition, to further reduce the possibility of leaked or condensed liquid from within the airflow path escaping and contaminating other components of the system, a layer of liquid retention material (not shown in the figures) may be provided on the interior of the protective cover or on the exterior of the storage container, to absorb liquid that has condensed within the airflow path.

The cartridge 20 is coupled to the device portion 40 by a push fitting. The cartridge housing is shaped to allow the cartridge 20 to couple to the device portion 40 in only two orientations, ensuring that the spring loaded electrical contact elements are received in the openings and contact the contact pads of the heater assembly. A connecting rib 48 of the device portion engages a recess 25 on the cartridge housing to retain the cartridge and device portion together.

The cartridge housing 22 and storage container 24 are moulded in one piece and formed from polypropylene. The liquid retention material 32 is formed from a polypropylene PET copolymer. The capillary material 31 is formed from glass fibre. The heater cap is formed from polyetheretherketone (PEEK). The heating element is formed from stainless steel and the electrical contact pads are formed from tin. The protective cover is formed from liquid crystal polymer (LCP).

To assemble the cartridge the storage container is first filled with the aerosol-forming substrate. The liquid retention material 32 is then placed into the open end of the storage container and the capillary material 31 placed on the liquid retention material. The heater cap, to which the heater assembly is already fixed, is then placed in the open end of the storage container. The storage container and heater cap may comprise keying features to ensure the heater cap is place in the correct orientation on the storage container. The protective cover 33 is then fitted to the housing 22 to retain all of the cartridge components in position.

The system is a handheld system, sized to fit comfortably in a user's hand. In operation, after the cartridge and device portion have been coupled together, the user presses button 41 to activate the device. The user then puffs on the mouthpiece 23 to draw air through the system. The control circuitry supplies power to the heater assembly continuously after activation of the device and based on detected user puffs, as will be described. The vapourised aerosol-forming substrate passes through the heating element and into the airflow passing through the system.

The user puffs are detected by a flow sensor (not shown) within the device portion, but in fluid communication with the airflow through the device. However, in another embodiment, the flow sensor may be omitted and the user required to press button 41 immediately prior to each puff.

Figure 3:
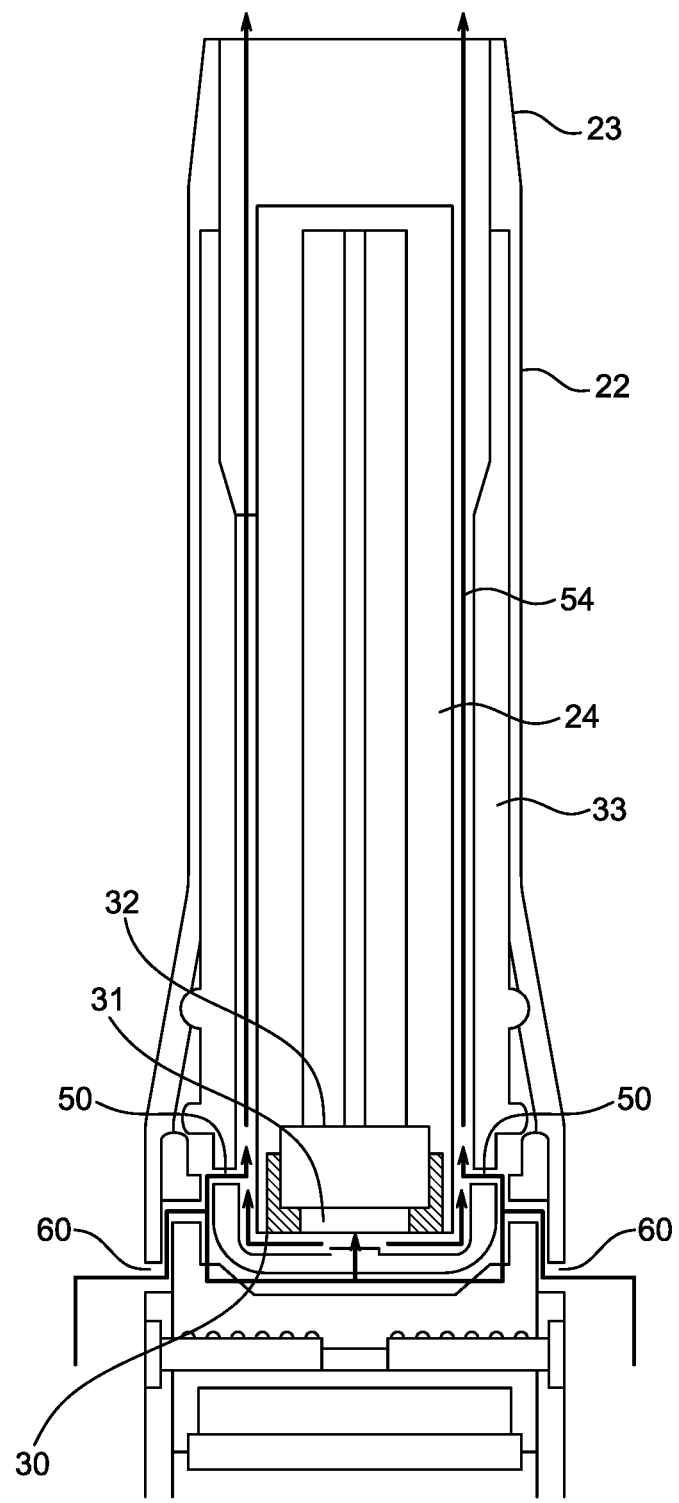
FIG. 3 illustrates the airflow through the system of FIG. 1.

FIG. 3 illustrates the airflow through the cartridge when a user puffs on the mouthpiece 23. Air is drawn into the system through inlets 60 formed between the housing of the device body and the housing of the cartridge 22. The air then passes through apertures formed in a connection portion of the device portion and into a cavity formed between the device portion and the protective cover 33. The air is then drawn into the cartridge both through the air inlet holes 37 on the front wall of the protective cover and through the dilution air inlets 50. Air drawn through the air inlet holes 37 impinges onto the heating element and entrains vapourised aerosol-forming substrate. The mixture of air and vapour is drawn away from the heating element along an airflow path 54 between the protective cover 33 and the storage container 24. Air drawn in through dilution air inlets 50 mixes with the vapour/air mixture from the heater assembly. As the mixture is traveling through the airflow path 54 the vapour cools and an aerosol is formed. This aerosol is drawn into the user's mouth through the mouthpiece 23.

The airflow path includes a 90 degree bend, following the exterior of the storage container. Any large liquid droplets or debris in the airflow will not pass around the bend but will hit the protective cover 33. This helps to ensure that a desirable aerosol reaches the user.

Figure 4:
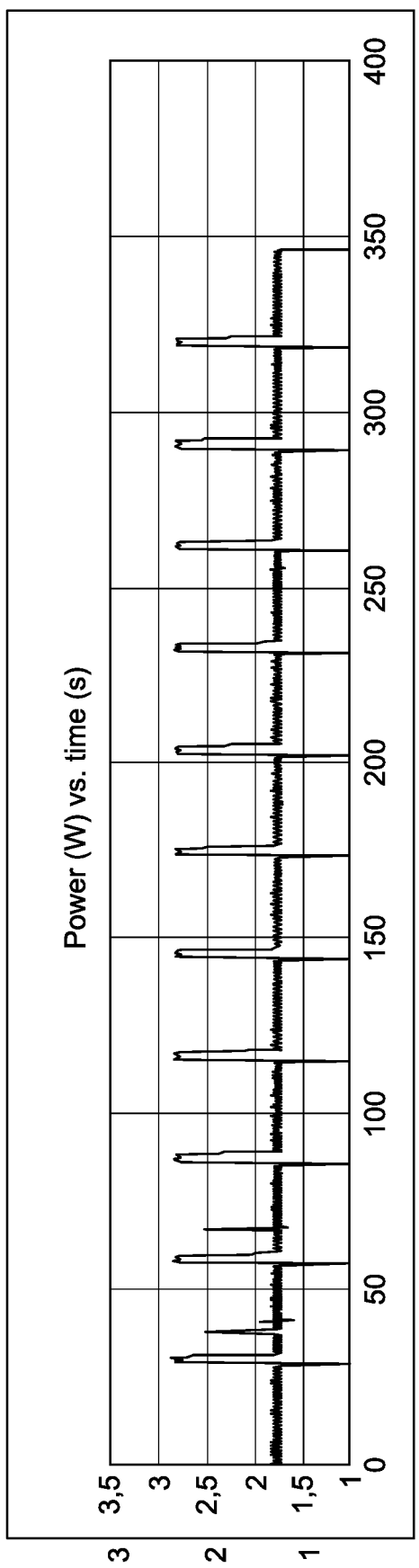
FIG. 4 is a plot of applied power versus time over the course of a session of use of the system.

FIG. 4 illustrates the delivery of power to the heating element during operation of a system of the type shown in FIG. 1, in order to preferentially evaporate nicotine over the glycerine in the liquid mixture. The system is activated at time t=0 by the user pressing the button 41. The control circuitry 44 supplies around 2 Watts to the heating element. This raises the temperature of the liquid proximate to the heating element to between 180 and 200 degrees centigrade. When a user puff is detected by the flow sensor, the control circuitry supplies a short burst of higher power. In this example, the control circuitry supplies 3 Watts of power for 3 seconds. Because of the airflow past the heating element during a user puff, there is a cooling of the heating element and also a reduction in pressure proximate the heating element. This means that during the period when the higher power is supplied there is only a limited increase in the heating element temperature, but there is a significant increase in liquid vaporisation. In this example the heating element reaches a temperature of no more than 220 degrees centigrade during each user puff.

The liquid aerosol-forming substrate 26 in a first example comprises 74% by weight glycerine, 24% by weight propylene glycol, and 2% by weight nicotine. This mixture can be heated so that the nicotine is preferentially evaporated compared to the glycerine. Nicotine has a normal boiling point of 247 degrees centigrade, glycerine has a normal boiling point of 290 degrees centigrade and propylene glycol has a normal boiling point of 188 degrees centigrade.

This heating control strategy has been found to result in close to 4% by mass nicotine in the delivered aerosol and less than 74% by mass glycerine in the delivered aerosol, on average over the first eight puffs of a usage session.

The additional power applied during puffs increases the aerosol condensed matter (ACM) and total nicotine delivered as compared to simply applying 2 Watts throughout the session.

In particular, the ACM increases from 1.4 mg/puff to 2 mg/puff, and the nicotine increases from around 20 µg/puff to 50 µg/puff.

In another example, the liquid aerosol-forming substrate 26 comprises 98% by weight vegetable glycerine, 24% and 2% by weight nicotine. The same power control strategy as illustrated in FIG. 4 is used. The resulting aerosol contains 2.8% by weight nicotine, on average over the first eight puffs, which is again greater that the concentration of nicotine in the liquid.

The additional power applied during puffs increases the aerosol condensed matter (ACM) and total nicotine delivered as compared to simply applying 2 Watts throughout the session. In particular, the ACM increases from 1.4 mg/puff to 2.25 mg/puff, and the nicotine increases from around 32 μg/puff to 40 μg/puff.

Applying higher power than 3 W during user puffs was found to further increase ACM and total nicotine delivered but did not significantly improve the percentage of nicotine by weight in the delivered aerosol.

In the examples above, the power is supplied based on predetermined power levels. Instead it is possible to control based on desired temperatures. The temperature of the heating element may be determined by monitoring its resistance or by using a separate, dedicated temperature sensor. For example, the heating element may be maintained at a first temperature, say 200 degrees centigrade between user puffs, and power increased by 1 Watt or the temperature increased by 20 degrees centigrade during each user puff. Different combinations of control based on power, or temperature may be used. Temperature control may be based on temperature ranges rather than single target temperatures. Power control may be based on control of a duty cycle of a supplied current to the heating element or elements.

It is also possible to use the same control strategy using different types of heater. The level of power required will depend of the properties of the heating element, and if it is a resistive heater, in particular on its electrical resistance.

Different users may prefer different aerosol properties. So it is also possible to allow a user to set the first power or first temperature of first temperature range or second power or a second temperature, or any combination of these parameters. The control circuitry may be programmable by the user using a suitable user interface, either on the system or on a connected computer, tablet or smart phone.

It is also possible for the first power or first temperature of first temperature range or second power or a second temperature, or any combination of these parameters, to be automatically set based on the identity of a liquid mixture being used as the aerosol-forming substrate. The identity of the liquid mixture may be determined by detecting a bar code or other indicia on the cartridge or may be input by a user using a suitable user interface, either on the system or on a connected computer, tablet or smart phone. Different liquid mixtures may benefit from being heated to different temperatures.

The exemplary embodiments described above illustrate but are not limiting. In view of the above discussed exemplary embodiments, other embodiments consistent with the above exemplary embodiments will now be apparent to one of ordinary skill in the art.

The invention claimed is:

1. An aerosol-generating device, comprising:
a heater assembly comprising at least one heating element;
an aerosol-forming substrate proximate to the heater assembly and comprising a liquid mixture comprising nicotine and a first aerosol-former, the first aerosol-former having a boiling temperature higher than that of the nicotine;
a power supply configured to supply power to the heater assembly to generate an aerosol from the aerosol-forming substrate;
a mouthpiece configured to draw aerosol out of the aerosol-generating device upon a puff by a user; and
control circuitry configured to
control the supply of power to the heater assembly,
supply a first power to the at least one heating element of the heater assembly or to supply a power sufficient to maintain the at least one heating element at a first temperature between 150 degrees centigrade and 200 degrees centigrade, between user puffs, and
supply a second power to the at least one heating element of the heater assembly, the second power being higher than the first power or being sufficient to raise a temperature of the at least one heating element above the first temperature to a second temperature between 200 degrees centigrade and 250 degrees centigrade, during user puffs, in order to provide preferential evaporation of nicotine over that of the first aerosol former.

2. The aerosol-generating device according to claim 1, wherein the first temperature is below a boiling point of the first aerosol-former.

3. The aerosol-generating device according to claim 1, wherein the first aerosol former is glycerol.

4. The aerosol-generating device according to claim 1, wherein the aerosol-forming substrate further comprises a second aerosol former, the second aerosol former having a lower boiling temperature than that of the first aerosol former.

5. The aerosol-generating device according to claim 4, wherein the second aerosol former is propylene glycol.

6. The aerosol-generating device according to claim 1, wherein the control circuitry is configurable by the user to select the first temperature or the first power.

7. The aerosol-generating device according to claim 6, wherein the control circuitry is further configured to calculate the second power dependent on the first power or the first temperature.

8. The aerosol-generating device according to claim 1,
wherein the heater assembly further comprises a plurality of heating elements, and
wherein the control circuitry is further configured to supply power to only a portion of the plurality of heating elements between the user puffs.

9. The aerosol-generating device according to claim 1, wherein the heater assembly further comprises a mesh of heating elements or a perforated heating plate.

10. The aerosol-generating device according to claim 1, further comprising a liquid reservoir holding the liquid aerosol-forming substrate and a liquid delivery mechanism configured to deliver the liquid aerosol-forming substrate from the liquid reservoir to the at least one heating element.

11. A method of generating a nicotine containing aerosol from an aerosol-forming substrate in an aerosol-generating system on which a user puffs, the aerosol-forming substrate comprising a liquid mixture comprising nicotine and a first aerosol-former, the first aerosol-former having a boiling temperature higher than that of the nicotine, the method comprising:
maintaining the aerosol-forming substrate at a first temperature between 150 degrees centigrade and 200 degrees centigrade between the user puffs; and
heating the aerosol-forming substrate to a second temperature between 200 degrees centigrade and 250 degrees centigrade during user puffs, so as to provide preferential evaporation of nicotine over that of the first aerosol former, wherein the second temperature is above the first temperature.

12. The method according to claim 11, wherein the second temperature is below a boiling temperature of first aerosol-former.

13. The method according to claim 11, wherein the aerosol-forming substrate comprises a second aerosol former, the second aerosol former having a lower boiling temperature than that of the first aerosol former.

14. The method according to claim 13, wherein the first temperature range is below a boiling temperature of nicotine and of the second aerosol former.

* * * * *